United States Patent

[11] 3,599,158

[72] Inventors Lars-Olof Noren
Huddinge;
Goran Anders Henrik Hemdal, Tyreso,
both of, Sweden

[21] Appl. No. 784,847
[22] Filed Dec. 18, 1968
[45] Patented Aug. 10, 1971
[73] Assignee Telefonaktiebolaget LM Ericsson
Stockholm, Sweden
[32] Priority Dec. 19, 1967
[33] Sweden
[31] 17/372/1967

[54] METHOD FOR MOVING VARIABLE DATA DURING OPERATION FROM A FIRST STORE FIELD TO A SECOND STORE FIELD IN THE DATA STORE OF A COMPUTER
1 Claim, 5 Drawing Figs.

[52] U.S. Cl. ........................................................ 340/172.5
[51] Int. Cl. ........................................................ G06f 9/18
[50] Field of Search ............................................ 340/172.5; 235/157

[56] References Cited

UNITED STATES PATENTS

| | | | |
|---|---|---|---|
| 3,273,129 | 9/1966 | Mullery et al. ................ | 340/172.5 |
| 3,289,175 | 11/1966 | Rice ............................ | 340/172.5 |
| 3,382,486 | 5/1968 | DeCourville ................. | 340/172.5 |
| 3,451,045 | 6/1969 | Bartlett et al. ............... | 340/172.5 |

*Primary Examiner*—Gareth D. Shaw
*Attorney*—Hane & Baxley

ABSTRACT: For a digital computer operating under a multilevel periodically occurring priority routine wherein information is transferable from a first field to a second field of a data store only during the lowest priority level, there is disclosed a method for updating information stored in the first field. The method contemplates preventing indiscriminate access to the first field. Instead, when during any level but the top priority level access is required to the first field for updating, the work being performed is interrupted and the computer switched to the top priority level. In this level, the updating information is simultaneously stored in corresponding locations of the first and second fields. Thereafter, the computer is restored to perform the interrupted work.

INVENTORS

LARS-OLOF NORÉN
GÖRAN ANDERS HENRIK HEMDAL

BY Hane and Baxley

ATTORNEYS

INVENTORS
LARS-OLOF NORÉN
GÖRAN ANDERS HENRIK HEMDAL
BY Hane and Baxley
ATTORNEYS INVENTORS
LARS-OLOF NORÉN
GÖRAN ANDERS HENRIK HEMDAL
BY Hane and Baxley
ATTORNEYS

METHOD FOR MOVING VARIABLE DATA DURING OPERATION FROM A FIRST STORE FIELD TO A SECOND STORE FIELD IN THE DATA STORE OF A COMPUTER

The invention refers to a method for transferring variable data, during operation, from a first store field to a second store field in the storage of a computer, particularly a computer for process control, which is working in real time on different priority levels wherein the operations are interrupted periodically and the orders, which have the higher priorities, are carried out first.

In a process controlled system, e.g. a stored-program store-controlled telecommunication system, the data concerning devices of the same type are in adjacent fields of the data store. It may become necessary, when there is an increase of the number of devices of a certain type, to transfer the whole store field for the devices of said type to another location in the data store where free space is available. The transfer of data takes place on the lowest priority level, in other words, during the time of a primary interval (i.e. between two periodic interruptions) when the computer has no normal work to do until the next interruption. This is not accompanied by any difficulty as long as it concerns unchangeable or permanent data. At a transfer of variable data it may happen, however, that a change of information takes place at the old address after the information from this address has already been transferred to the new address owing to the fact that the change of information takes place on a higher priority level than the transfer itself. It must therefore be guaranteed that all the changes, which, during the transfer of data take place at the old address, also takes place simultaneously at the new address so that at the termination of the transfer it is certain that the information at the new and old address is the same.

A object of the invention is to eliminate this inconvenience and to insure that every change in information at the old address is carried out simultaneously at the new address.

Briefly, the invention contemplates a digital computer operating in a multilevel priority routine wherein transfers from a first to a second data field can occur only at the lowest priority level. Whenever data is to be updated in the first field the computer is switched to the top priority level and the updating data is transferred to both fields substantially simultaneously.

Figure 1:
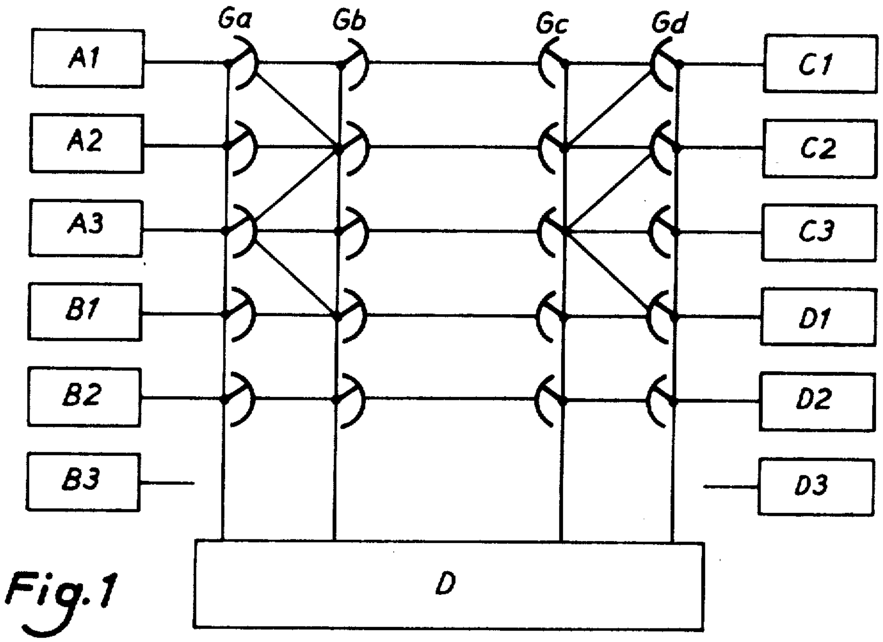
Figure 3:
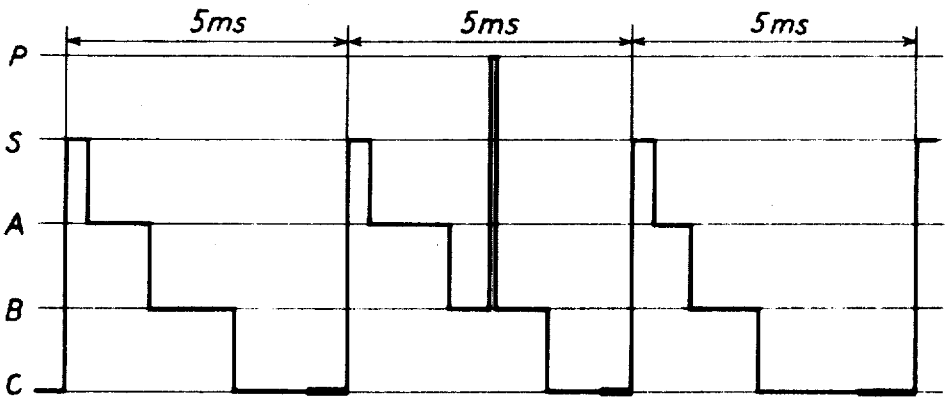
Figure 2:
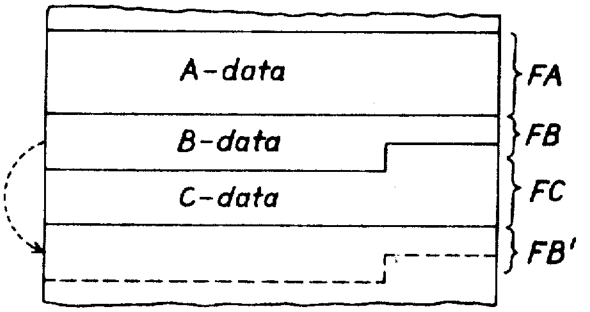
Figure 4A:
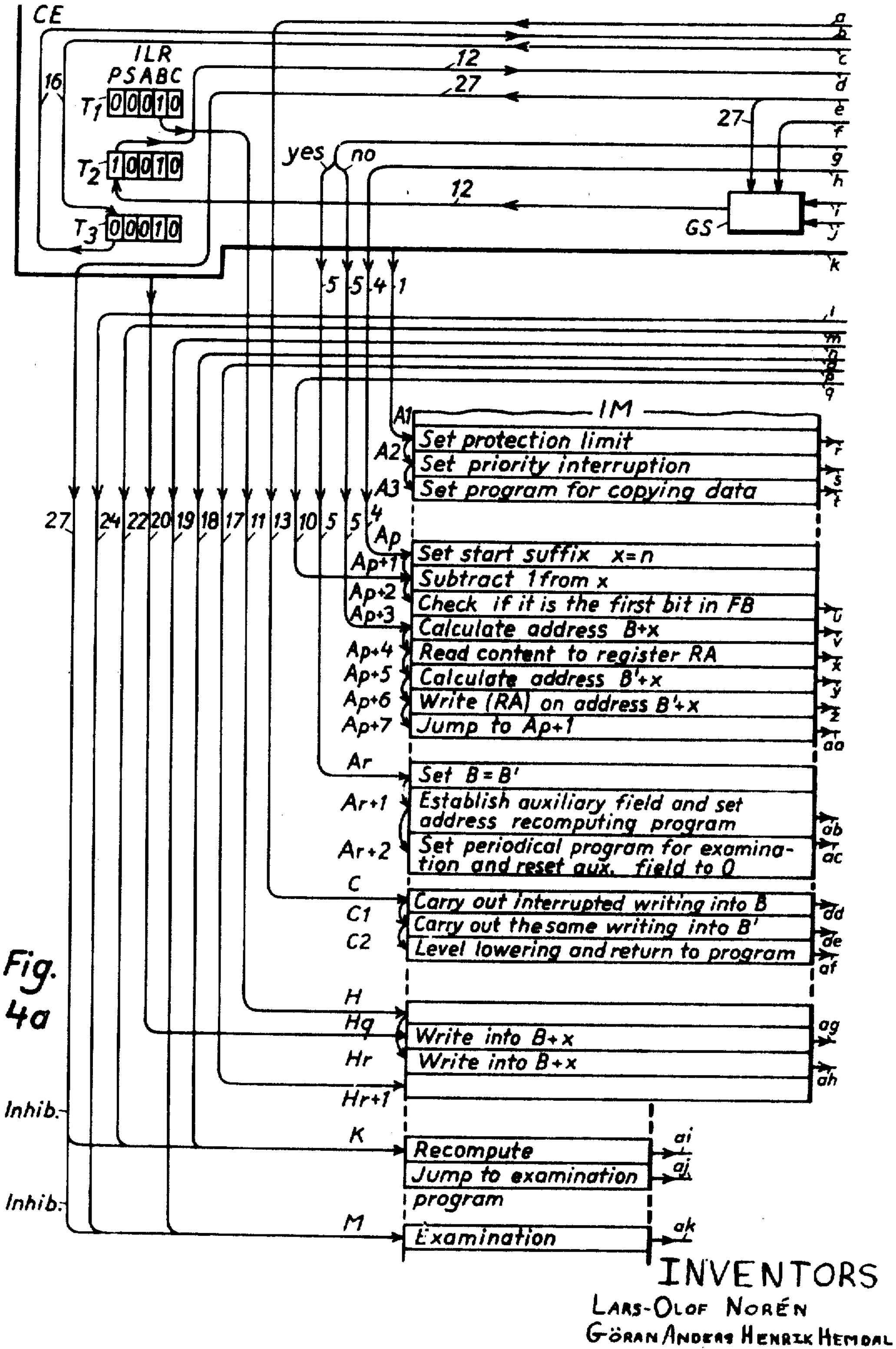
Figure 4B:
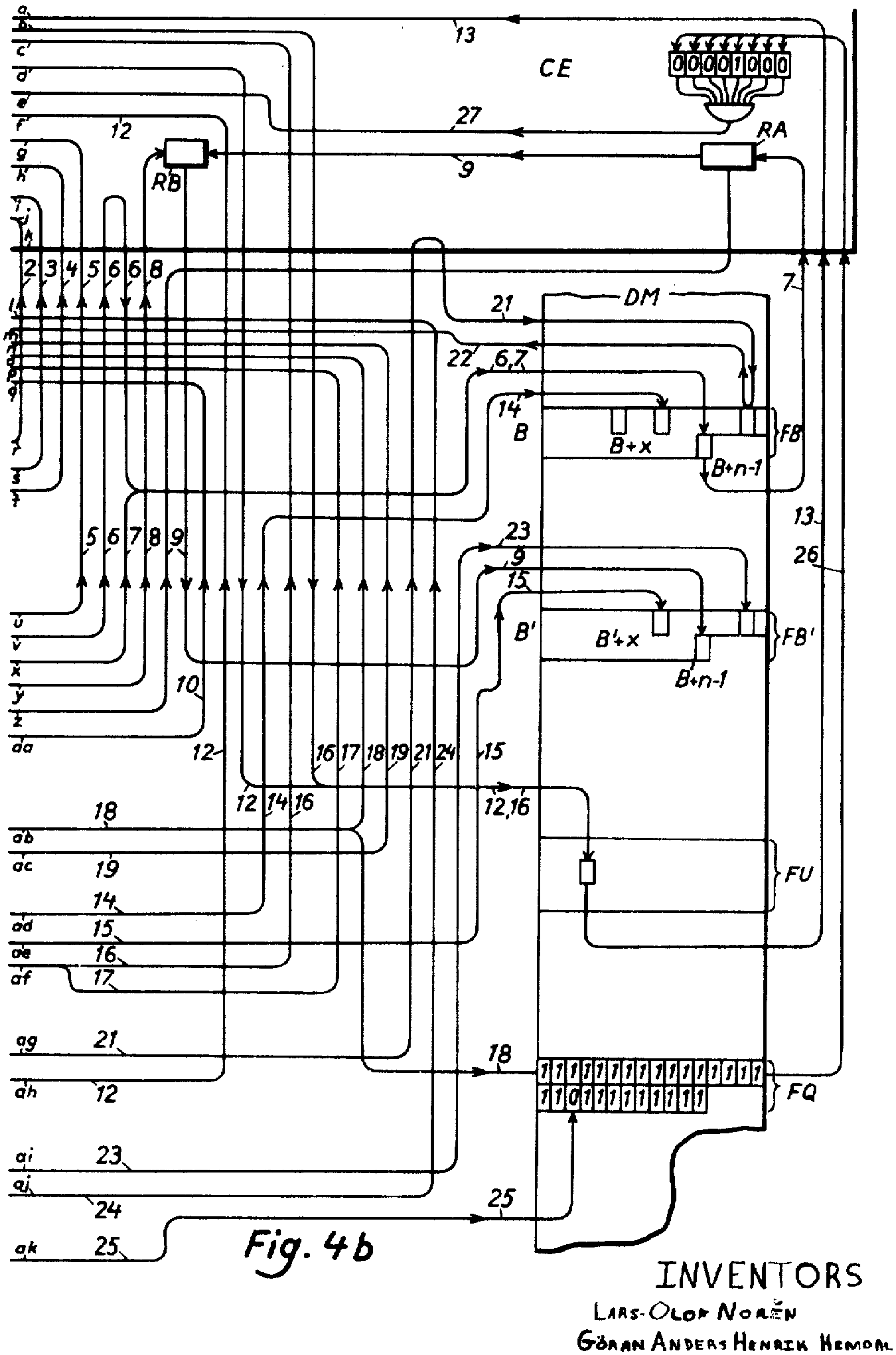

Other objects, features and advantages of the invention will be apparent from the following detailed description when read with the accompanying drawing wherein FIG. 1 shows schematically a telephone exchange with a number of connection devices, FIG. 2 shows the data store with some data fields indicated, FIG. 3 shows schematically different priority levels during the operation of the computer and FIGS. 4*a* and 4*b* show schematically the instruction store, the data store and the central processing unit of the computer with the different processes symbolized during the data transfer.

FIG. 1 shows schematically a switching center in a telecommunication system consisting of a number of incoming relay sets A, A2......B1, B2...... and a number of outgoing relay sets C1, C2......, D1, D2...... which may be connected to each other via selectors G*a*, G*b*, G*c* and G*d*. An incoming relay set may be connected to a number of outgoing relay sets and to form links therewith in order to establish a telecommunication connection. The setting of the connection for the links is under control digital computer D in known manner. A typical computer can be an APZ 130 manufactured by L.M. Ericsson. The data store of the computer includes information for each device, e.g. concerning their free- or busy condition etc. for a telecommunication connection.

Information concerning devices of the same type are grouped in the data store of the computer each in its own store field, as it is shown in FIG. 2. According to the example the field FA includes the information concerning the condition of the devices A1, A2 etc. the field FB information concerning the condition of the devices B1, B2 etc., the field FC includes information concerning the devices which are included in a connection link. If it is assumed, that the number of devices of type B must be increased and there is no longer space in the field FB for all the information concerning these devices so the contents of the whole field must be transferred to another field FB' with larger free space. The transfer may suitably be performed so that all the information is identically copied over.

For a computer which controls a telecommunication system there are a number of priority levels depending on the level of urgency of the operation to be carried out. Transfer of data, certain check processes, print out of metering information etc., should always take place on the lowest priority level i.e., during a period when the work load of the computer is relatively low. FIG. 3 shows schematically the operation of the computer on different priority levels during a number of primary intervals or work periods. In accordance with the example a working period is 5 milliseconds long at the beginning of every period the computer works at the highest priority level S when all the operations on this level have been carried out the computer passes to the immediately following lower level A and passes successively to the lower level immediately following until the lowest level C is reached. Even on the lowest level the computer must carry out some of the work belonging to normal operation. Only if all the work on all the levels has been concluded is there the possibility that there is a certain time left before a clock interruption occurs, i.e. the work at the end of the 5 milliseconds long period passes to the highest working level after preserving all the information concerning the work of the lower priority. The sections on the level C during which, in accordance with the example, the transfer of data can take place are indicated in the diagram by a thick line. The data which will be transferred is permanent as well as variable data. If the transfer would take place during such a period when there is absolutely no traffic there would be no difficulty for such a transfer to take place on this lowest level all the time. However, because changes occur permanently in the information in the data store, it may happen, that a change occurs after the data transfer has been carried out. This means that the information in the new field and in the original field will not be the same, in other words the information in the new field will be erroneous. In order to eliminate this inconvenience it is suggested, according to the invention, that as soon as a change of information has occurred in the original field the change is simultaneously transferred to the new field. This transfer, however, cannot take place on the same priority level as regular transfers but at the highest to a priority level P and, after the storing of the information in the two fields, the work can continue on the same level on which it had been proceeding before such storing took place. This is symbolically indicated in FIG. 3, according to which, e.g. at the work on level B, the necessity occurs to carry out a storing in a field of the data store during a transfer of data. When the storing of information is going to take place the priority level is raised to level P which is a level intended for execution of operations of higher degree of urgency than the normal functions. The storing of information is carried out simultaneously in both the old and the new address, whereupon the computer returns to work on the working level that was interrupted. This will be explained in more detail in connection with FIGS. 4*a* and 4*b*.

FIGS. 4*a* and 4*b* show schematically the central unit CE, the instruction store IM and the data store DM of a computer. The operations which belong to the individual instructions are indicated by flow arrows which are numbered to correspond to the sequence in which the different steps occur. The instruction store IM receives the instruction order in the usual manner. In the data store DM the store field FB from which the information is going to be transferred and the store field FB' to which the information will be transferred are indicated. When the transfer is to start the operator gives the corresponding command, whereby the instruction word on the address $A_1$ is selected. This is indicated by the flow line (1).

This instruction means, that a protection limit GS for the store is activated in the central processing unit. This protection limit primarily includes two registers, into which are written in correspondence to the transfer program, the lowest and the highest addresses of the store field from which the transfer will take place. A number of logical circuits associated with the registers emit an output signal in dependence of whether an address is found between addresses stored in the two registers or not. This operation is indicated by the arrow (2). The next instruction in the instruction store is found on the address $A_2$ which signifies, that every information which is addressed to the protected space, will influence the protection limit, and owing to this make a temporary raising of the priority level possible during the time the storing takes place. This operation is indicated by the arrow (3). Simultaneously an instruction on the address $A_3$ of the instruction store is indicated which means, that the data transfer routine is connected and the first instruction in the data transfer routine is indicated on the address $A_\mu$. This operation is indicated by the arrow (4). This routine causes a transfer of the information from the field FB to the field FB' in the manner which has been explained in connection with FIG. 3, whereby the transfer takes place on the lowest priority level during the periods indicated in FIG. 3 with a thick line. If it is assumed, that the field FB, from which the transfer of data will take place, extends from the address B to the address B+$n$ the instruction in the word with the address $A_\mu$ signifies that start index is set $x=n$. The start instruction in the updating program is found at the address $A_{\mu+1}$ and it means, that 1 is to be subtracted from $x$. In other words that the last information unit found in the data field FB will be indicated. The instruction at the address $A_{\mu+2}$ means that a comparison must take place in order to state whether the first information unit of the field FB has not yet been reached. If it has it means that the updating is finished. If the comparison would show that the first unit of information has been reached the address $A_{\mu+3}$ is indicated. This operation is indicated by the arrow (5). If it is assumed, that the first unit has not yet been reached the address B+$x$ is calculated and the calculated address is indicated in the field FB. This operation is indicated by the arrow (6). The next instruction with the address $A_{\mu+4}$ means that the contents of the address indicated is transferred to a process register RA in the central processing unit and this process is indicated by the arrow (7). According to the next instruction on the address $A_{\mu+5}$ the new address B'+$x$ is calculated to which the information obtained from the field FB and will be transferred. This in register RA operation is indicated by the arrow (8). The next instruction on the address $A_{\mu+6}$ means, that the information which has been obtained from the field FB and stored in register RA will be transferred via register RB to the calculated address B'+$x$. This operation is indicated by the arrow (9). The next instruction at the address $A_{\mu+7}$ means, that a jump back to the address $A_{\mu+1}$ is carried out where 1 is subtracted from the last indicated address in the field FB. This operation is indicated by the arrow (10). The process goes on exactly in the same manner until it is found by examination according to the instruction word with the address $A_{\mu+2}$ that even the first unit of information in the field FB has been transferred, whereupon the process can be concluded according to the arrow (5) and the address B is replaced with the address B'. Thereafter all the new information is addressed by B'.

As has been previously mentioned the storing of data which is changed during the transfer routine takes place on a higher priority level P than the transfer itself. The priority level P as a matter of fact must be still higher than the levels S, A, B, C on which the normal operation is carried out. Consequently, if the need for changing information in the field FB would arise during the transfer itself, one must guarantee, that this information is immediately transferred to the new field. As has been previously mentioned there is a protection limit GS for the store which prevents new information from being stored in the field from which the transfer of data takes place. This protection limit has the function, that if an address in the protected space is indicated, the protection limit causes certain functions which make the shift to the higher priority level possible. The protection limit is opened temporarily to cause the storing of new information both in the old and in the new store field. Consequently if during the transfer itself an arbitrary instruction, e.g. the one on the address $H_r$, prescribes, that the storing will take place in a word with the address B+$x$ the protection limit establishes, that the address is within the protected space and activates a circuit for control of the priority level. In this register a numerical position corresponds to each one of the priority levels. The positions which belong to a level on which work continues or continuing work has been interrupted include a "one." The level B was started at the address H, as indicated by the arrow (11). According to the example the work of the computer continues on the level B, which is symbolized by a "one" stored in the position corresponding to the level in ILR at the time $T_1$. The operation, by which at the indication of the instruction the above mentioned protection limit and the arrangement for control of the priority level is activated, is indicated by the arrow (12). The activation of the register ILR for the level control also means, that the information for the continuing work on the level B is stored in a special field FU in the data store DM and the priority level register ILR obtains a "one" in the position which corresponds to the highest priority level P which is symbolized by $T_2$. When the storing is concluded an instruction on the address C is indicated, symbolized by the arrow (13), which means, that the interrupted storing on the address B+$x$ which was previously protected, will be carried out, as indicated by the arrow (14). The next instruction on the address $C_1$ means, that the same storing will take place on the address B'+$x$ and this process is indicated by the arrow (15). The next instruction on the address $C_2$ means, that return to the earlier priority level will take place, the circuit for the control of the priority level is activated as indicated by the arrow (16). The numerical position corresponding to the priority level P becomes 0 and, simultaneously, restoring of the saved information belonging to the level B from the store field to the central processing unit takes place. Simultaneously a return to the program which was interrupted takes place, and the next instruction word on the priority level B, i.e. the instruction word with the address $H_{r+1}$ is indicated, as symbolized by the arrow (17).

As mentioned in the instruction of the description there is information which is dependent on the occupied condition of two or several devices, i.e. information indicating which devices are included in an established connection link. Thus, during the transfer of data to the new field, it must be necessary to accept data about the state of the devices even though the address for such data is not known. It can occur, that a connection relay set included in a connection link is still connected when the information concerning this connection relay set is transferred. When disconnecting, the old address concerning the devices included in the link is still recorded and consequently after the transferring of data the previously recorded busy condition could no longer be changed. In order to prevent this, there is a control field $F_Q$ including a number of binary positions corresponding to a number of transferred information units which at the beginning of the transferring are all set to one. When the transfer of the whole data field is concluded and the base address B is replaced by B' a program is connected which has the result that every change in information on the old address will be carried out on the new address. This program is connected for every operation within the protected area, (the protection limit is adjusted so that interruption is obtained for reading as well as writing), after which the work returns to the interrupted program. As soon as a device, the information of which is being transferred, is released, the numerical position in the control field associated with such device is set to 0. When transferring data belonging to an idle device, 0-setting takes place simultaneously with the data transfer. When all the numerical positions in the control field are 0 then all the busy devices, the information of which has been transferred, are idle. Thereafter the protection limit is disconnected and the data transfer is concluded.

It is indicated in FIG. 4 that when the old address B has been replaced with the new address B' according to the instruction word on the address $A_r$ an instruction follows. The instruction means that said control field $F_Q$ is connected and moreover a recalculation program is connected in order to recalculate the old address to the new one. This operation is indicated by the arrow (18). The next instruction on the address $A_{r+1}$ means, that a periodic program is connected for examination of the control field in order to determine whether or not all the numerical positions have been set to 0 in order to set to 0 a numerical position if the associated device which had been busy during transfer and is now idle as indicated by the arrow (19). When an operation is performed on the old address, as indicated by the arrow (20) a recalculation by means of the recalculation program on the address K takes place as indicated by the arrows (21)—(22). As a result of the recalculation the operation is performed on the new address as indicated by the arrow (23). After that, the return to the program which would have been carried out on the address B+*x* takes place and the examination program is periodically carried out as indicated by the arrow (24). When all the numerical positions in the control field have been set to zero, the control field, the protection limit, the recalculation program and investigation program for the control field are disconnected, as indicated by the arrows (25)—(27) and the field on the old address is available for other purposes.

We claim:

1. In a digital computer having a data store, an instruction store and a central processing unit, said digital computer working in real time on different priority levels and wherein variable data is transferable from a first address of a first field of the data store to a second address of a second field of the data store during the lowest priority level, the method of updating data in the first address when the digital computer is operating at a priority level other than the highest priority level, said method comprising the steps of interrupting the operations being performed by the digital computer when the updating is called for, switching the digital computer to the highest priority level, transferring the updating data to both the first address of the first field and the second address of the second field, and thereafter restoring the digital computer to continue performing the interrupted operations.